(12) United States Patent
Ueda

(10) Patent No.: US 12,720,202 B2
(45) Date of Patent: Aug. 25, 2026

(54) IMAGE PICKUP APPARATUS

(71) Applicant: CANON KABUSHIKI KAISHA, Tokyo (JP)

(72) Inventor: Yuji Ueda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 18/943,333

(22) Filed: Nov. 11, 2024

(65) Prior Publication Data

US 2025/0193523 A1 Jun. 12, 2025

(30) Foreign Application Priority Data

Dec. 12, 2023 (JP) ................................ 2023-209448

(51) Int. Cl.
*H04N 23/68* (2023.01)

(52) U.S. Cl.
CPC ....... *H04N 23/687* (2023.01); *H04N 23/6812* (2023.01)

(58) Field of Classification Search
CPC ......................... H04N 23/687; H04N 23/6812
USPC ........................................................... 396/55
See application file for complete search history.

(56) References Cited

U.S. PATENT DOCUMENTS

2008/0187301 A1* 8/2008 Takahashi ................ G03B 5/00 396/55

FOREIGN PATENT DOCUMENTS

JP 2018180258 A 11/2018
JP 2021166334 A 10/2021

* cited by examiner

*Primary Examiner* — Joel W Fosselman
(74) *Attorney, Agent, or Firm* — Cowan, Liebowitz & Latman, P.C.

(57) ABSTRACT

An image pickup apparatus includes a fixed member, a movable member holding an image sensor and movable in a direction orthogonal to an optical axis, a drive unit that drives the movable member, a rollable member disposed between the fixed and movable members, a first yoke member disposed on the fixed member, a second yoke member disposed on the movable member, and a magnet member disposed on the first or second yoke member. A surface of the first yoke member and a surface of the second yoke member overlap each other in a first direction orthogonal to an optical axis direction. A surface of the first yoke member and a surface of the second yoke member overlap each other in a second direction parallel to the optical axis. The magnet, first yoke, and second yoke members form a magnetic circuit passing through the first to fourth surfaces.

13 Claims, 10 Drawing Sheets

IMAGE PICKUP APPARATUS

BACKGROUND

Technical Field

The disclosure relates to an image pickup apparatus.

Description of Related Art

An image pickup apparatus having an image stabilizing mechanism driven by a voice coil motor (VCM) has conventionally been known. Such an image stabilizing mechanism can reduce image blur by moving a movable portion that holds an image sensor in a plane relative to a fixed portion. The image pickup apparatus having the image stabilizing mechanism that moves the image sensor using the VCM is to constantly generate a driving force by energizing a coil to hold the movable portion, in order to properly maintain the position of the image sensor. Thus, power consumption is likely to increase and the capturable number of shots is likely to reduce.

Japanese Patent Laid-Open No. 2018-180258 discloses an image pickup apparatus having a gravity support portion that supports a movable portion with a force equal to the gravity acting on the movable portion. Japanese Patent Laid-Open No. 2021-166334 discloses an image pickup apparatus that assists in holding the movable portion utilizing a reaction force caused by bending a flexible printed circuit (FPC) that electrically connects an image sensor and a control board.

The image pickup apparatus disclosed in Japanese Patent Laid-Open No. 2018-180258 requires the gravity support portion to support the movable portion, and thus the image pickup apparatus becomes complicated and large. The structure disclosed in Japanese Patent Laid-Open No. 2021-166334 cannot reduce power consumption depending on the attitude of the image pickup apparatus.

SUMMARY

An image pickup apparatus according to one aspect of the disclosure includes a fixed member, a movable member holding an image sensor and movable relative to the fixed member in a direction orthogonal to an optical axis, a drive unit configured to drive the movable member, a rollable member disposed between the fixed member and the movable member, a first yoke member disposed on the fixed member, a second yoke member disposed on the movable member, and a magnet member disposed on one of the first yoke member and the second yoke member. A first surface of the first yoke member and a second surface of the second yoke member overlap each other in a first direction orthogonal to an optical axis direction. A third surface of the first yoke member and a fourth surface of the second yoke member overlap each other in a second direction parallel to the optical axis. The magnet member, the first yoke member, and the second yoke member form a magnetic circuit passing through the first surface, the second surface, the third surface, and the fourth surface.

Further features of various embodiments of the disclosure will become apparent from the following description of embodiments with reference to the attached drawings.

DETAILED DESCRIPTION

Referring now to the accompanying drawings, a detailed description will be given of embodiments according to the disclosure. A description will now be given of an example structure that applies a drive apparatus according to this embodiment to an image stabilizing apparatus in an image pickup apparatus, but the application example of the drive apparatus according to the present disclosure is not limited to the image pickup apparatus.

Figure 1:
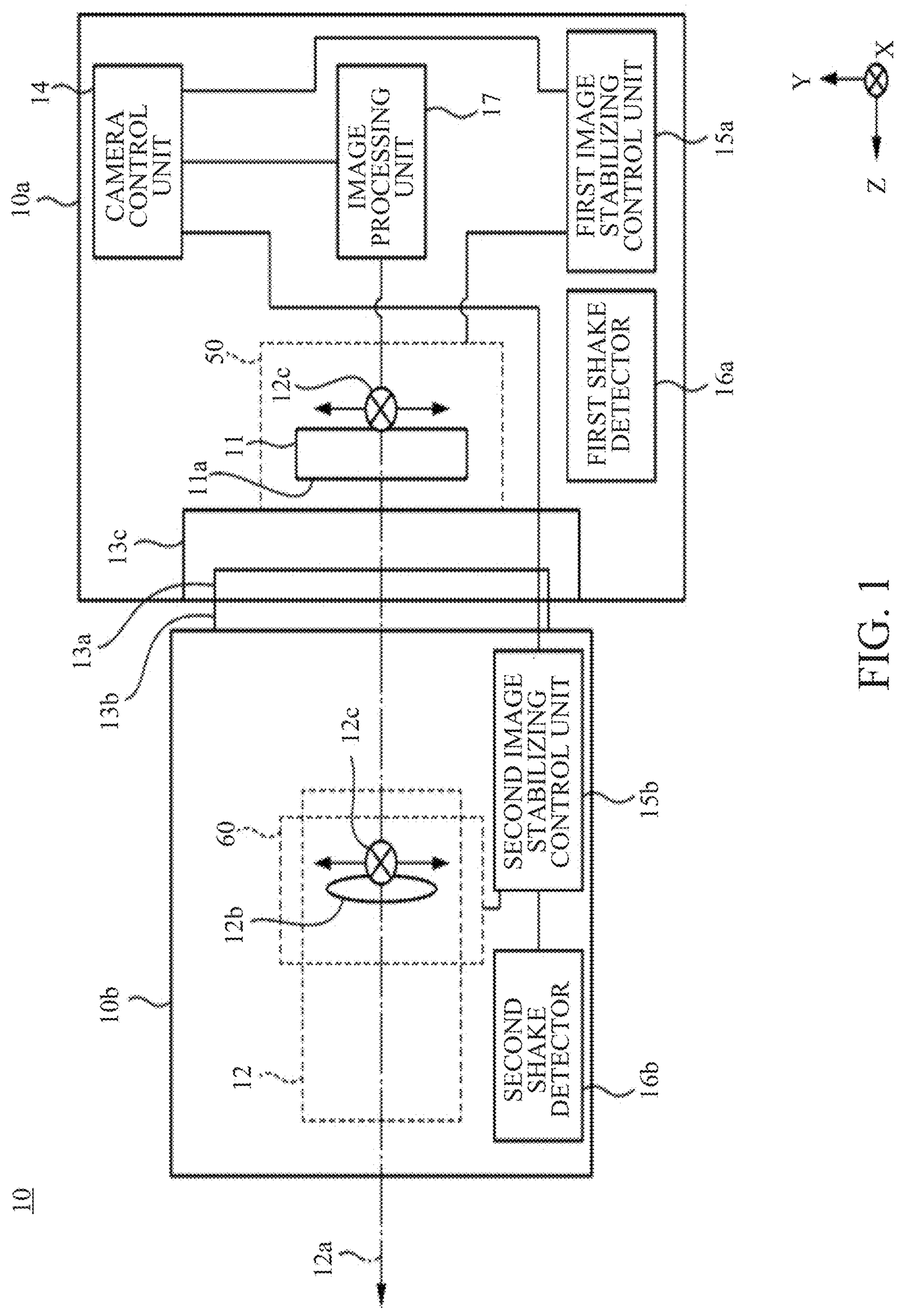
FIG. 1 is a schematic diagram of an imaging system according to this embodiment.

Referring now to FIG. 1, a description will be given of an imaging system 10 according to this embodiment. FIG. 1 is a schematic configuration diagram of the imaging system 10. The imaging system 10 is a so-called mirrorless digital camera, and includes a body unit 10*a* as an image pickup apparatus (camera body), and a lens apparatus (interchangeable lens) 10*b* attachable to and detachable from the body unit 10*a*. This embodiment is not limited to this example, and is applicable to an image pickup apparatus in which the body unit and the lens apparatus are integrated.

The body unit 10*a* includes an image sensor 11 having an imaging surface 11*a*, a base member 13*c*, a mount member (body-unit mount member) 13*a*, a camera control unit 14, a first image-stabilizing control unit 15*a*, a first shake detector 16*a*, an image processing unit 17, and a first image stabilizing unit 50. The first image-stabilizing control unit 15*a* is a control unit configured to control a drive unit that drives a holding member 31. The lens apparatus 10*b* includes an imaging optical system 12 including an image stabilizing lens 12*b*, a mount member (lens-side mount member) 13*b*, a second image-stabilizing control unit 15*b*, a second shake detector 16*b*, and a second image stabilizing unit 60.

A virtual light ray that is a representative light beam irradiated onto the imaging surface 11*a* of the image sensor 11 through the imaging optical system 12 will be called an optical axis (imaging optical axis) 12*a*, and a plane orthogonal to the optical axis 12*a* will be called an optical-axis orthogonal plane 12*c*. The optical axis 12*a* passes through the center of the imaging surface 11*a* and is orthogonal to the imaging surface 11*a*. In order to clarify the arrangement within the imaging system 10 of and positional relationship among components in the imaging system 10, an X direction, a Y direction, and a Z direction, which are orthogonal to one another, will be defined. The Z direction is parallel to the optical axis 12*a*, the X direction is a width direction (horizontal direction) of the imaging system 10, and the Y direction is a height direction (vertical direction) of the imaging system 10. In a case where the X direction and the Z direction are both in a horizontal plane, the Y direction is the vertical direction. Therefore, the optical-axis orthogonal plane 12*c* is the XY plane. The attitude (camera attitude or orientation) of the imaging system 10 in a case where the Z direction coincides with the direction of the optical axis 12*a* will be called a "normal position."

The image sensor 11 is a photoelectric conversion element such as a Complementary Metal-Oxide-Semiconductor (CMOS) image sensor or a Charge Coupled Device (CCD) image sensor. The image sensor 11 is disposed so that the imaging surface 11*a* faces the object side (lens apparatus 10*b* side) and is orthogonal to the optical axis 12*a*. The image sensor 11 generates an image signal by photoelectrically converting an optical image of an object formed on the imaging surface 11*a* by the imaging optical system 12. The image signal generated by the image sensor 11 is converted into image data by performing various processing in the image processing unit 17, and is stored in an unillustrated memory (storage device). The camera control unit 14 is a calculator in an unillustrated main IC, and controls an overall operation of the imaging system 10 by accepting an input operation from a user via an unillustrated operation unit.

The imaging optical system 12 includes an unillustrated lens unit disposed inside the lens apparatus 10*b*, and images reflected light from an unillustrated object on the imaging surface 11*a* of the image sensor 11. In the imaging system 10, in order to dispose the image sensor 11 with high positional accuracy relative to the optical axis 12*a*, the image sensor 11 is attached to the base member 13*c* in the body unit 10*a*, and the lens apparatus 10*b* is also connected to the base member 13*c*. At that time, the image sensor 11 is attached to the base member 13*c* via the first image stabilizing unit 50. The lens apparatus 10*b* is connected to the base member 13*c* via the mount member 13*b* of the lens apparatus 10*b* and the mount member 13*a* of the body unit 10*a*.

The first image stabilizing unit 50 corrects image blur caused by shaking in the imaging system 10 by moving the image sensor 11 in a direction orthogonal to the optical axis 12*a* (which will sometimes be referred to as an optical-axis orthogonal direction hereinafter) or rotating it within the optical-axis orthogonal plane 12*c*, so as to acquire a clear object image. More specifically, as the attitude of the imaging system 10 changes relative to the object during imaging, the imaging position of an object light beam on the imaging surface 11*a* of the image sensor 11 changes, and an obtained through the image sensor 11 blurs. In this case, in a case where the attitude change of the imaging system 10 is sufficiently small, the change in the imaging position is uniform within the imaging surface 11*a* and can be regarded as a translational or rotational movement (image surface blur) within the optical-axis orthogonal plane 12*c*. Therefore, by translating or rotating the image sensor 11 in the optical-axis orthogonal plane 12*c* so as to cancel out the image blur, a clear object image with image blur corrected can be obtained. In moving the image sensor 11 in a direction parallel to the imaging surface 11*a*, the image sensor 11 may be moved in a direction orthogonal to the imaging surface 11*a*.

Similarly, the second image stabilizing unit 60 corrects image blur caused by a shake occurring in the imaging system 10 by moving the image stabilizing lens 12*b* in an optical-axis orthogonal direction or rotates it in the optical-axis orthogonal plane 12*c*, so as to obtain a clear object image. That is, by moving the image stabilizing lens 12*b* in an optical-axis orthogonal direction, the optical axis 12*a* is refracted. At this time, the image stabilizing lens 12*b* is moved in the optical-axis orthogonal direction so as to cancel out the image blur. Thereby, a clear object image with image blur corrected can be obtained. Since the image stabilization principle that moves the image sensor 11 or the image stabilizing lens 12*b* is well known, a detailed description will be omitted. While the image stabilizing lens 12*b* is moved in the optical-axis orthogonal direction, the image stabilizing lens 12*b* may also be moved in the optical axis direction.

The first image stabilizing unit 50 includes a fixed portion 20, a movable portion 30, and a plurality of drive force generators. The fixed portion 20 is fixed to the base member 13*c*, and the movable portion holds the image sensor 11. The movable portion 30 is supported by the fixed portion 20 with three degrees of freedom, and can move in the optical-axis orthogonal direction relative to the fixed portion 20 and rotate within the optical-axis orthogonal plane 12*c*. In other words, the first image stabilizing unit 50 is configured as a drive apparatus (so-called XYθ stage) capable of drive control on three axes, and can move the image sensor 11 in the optical-axis orthogonal direction and rotate it within the optical-axis orthogonal plane 12*c*.

The second image stabilizing unit 60 includes a fixed portion, a movable portion, and a plurality of drive force generators. The fixed portion is fixed to an unillustrated housing of the lens apparatus 10*b*, and the movable portion holds the image stabilizing lens 12*b*. The movable portion is supported by the fixed portion with two degrees of freedom, and can move in the optical-axis orthogonal direction relative to the fixed portion. In other words, the second image stabilizing unit 60 is configured as a drive apparatus (so-called XY stage) capable of drive control in two axes, and can move the image stabilizing lens 12*b* in an optical-axis orthogonal direction.

Each of the first shake detector 16*a* and the second shake detector 16*b* includes a gyro sensor or an acceleration sensor, etc., and detects an angular velocity or acceleration, etc. in each direction of the imaging system 10 as shake information on the imaging system 10. Each of the first image-stabilizing control unit 15*a* and the second image-stabilizing control unit 15*b* calculates an angular change amount or moving amount in each direction of the imaging system 10 as shake information by integrating the angular velocity or acceleration detected by the first shake detector 16*a* and the second shake detector 16*b*. The first image-stabilizing control unit 15*a* also calculates a moving target value of the image sensor 11 based on the shake information detected by the first shake detector (first detector) 16*a*, and controls the driving of the first image stabilizing unit 50. Thereby, the movement of the image sensor 11 can be controlled. Similarly, the second image-stabilizing control unit 15*b* calculates a moving target value of the image stabilizing lens 12*b* based on the shake information detected by the second shake detector 16*b*, and controls the driving of the second image stabilizing unit 60. Thereby, the movement of the image stabilizing lens 12*b* can be controlled.

The imaging system 10 may include only one of the first image stabilizing unit 50 and the second image stabilizing unit 60. In a case where the imaging system 10 does not include the first image stabilizing unit 50, the image sensor 11 is fixedly disposed relative to the optical axis 12*a*. On the other hand, in a case where the imaging system 10 does not include the second image stabilizing unit 60, the image stabilizing lens 12*b* is basically unnecessary. In other words, the imaging optical system 12 in the lens apparatus 10*b* is designed to obtain a desired optical characteristic with a lens configuration that does not include the image stabilizing lens 12*b*.

Figure 2:
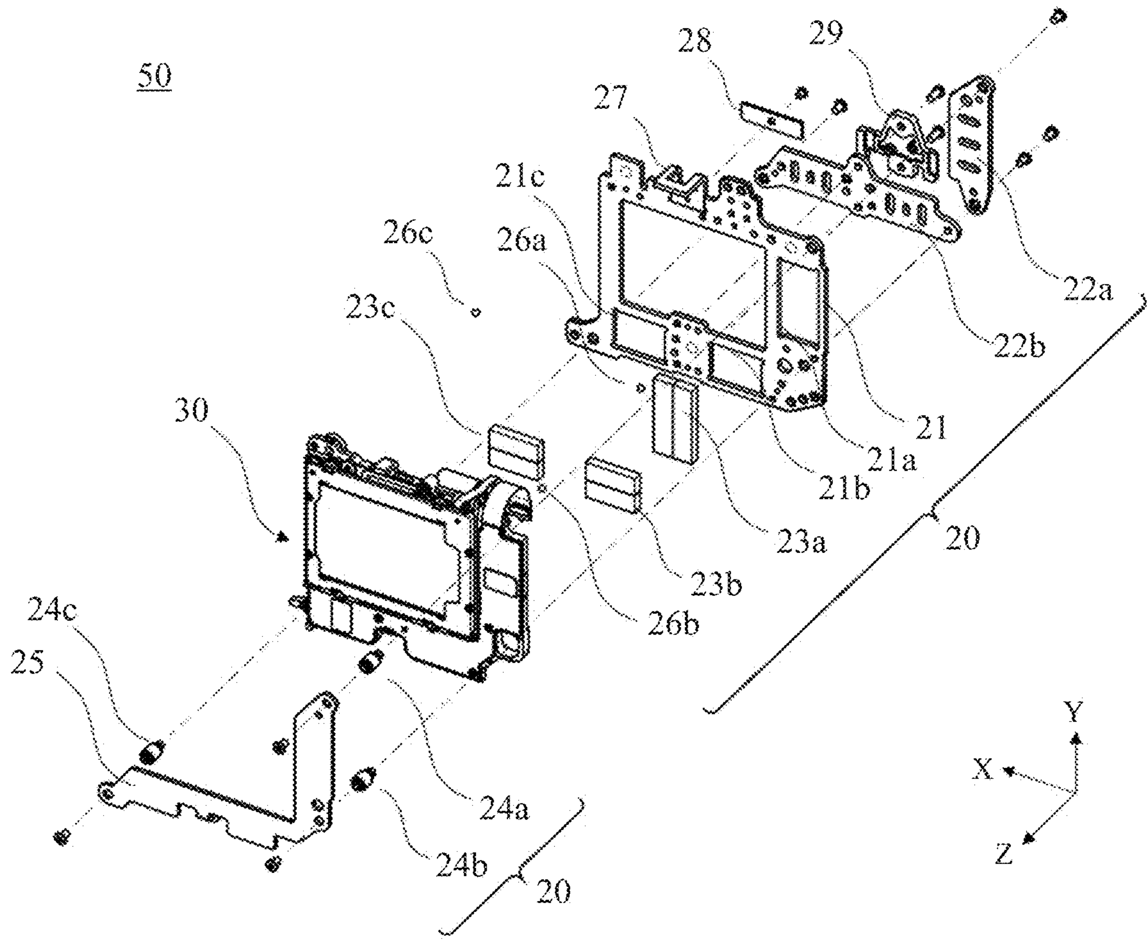
FIG. 2 is an exploded perspective view of an image stabilizing unit according to this embodiment.
Figure 3:
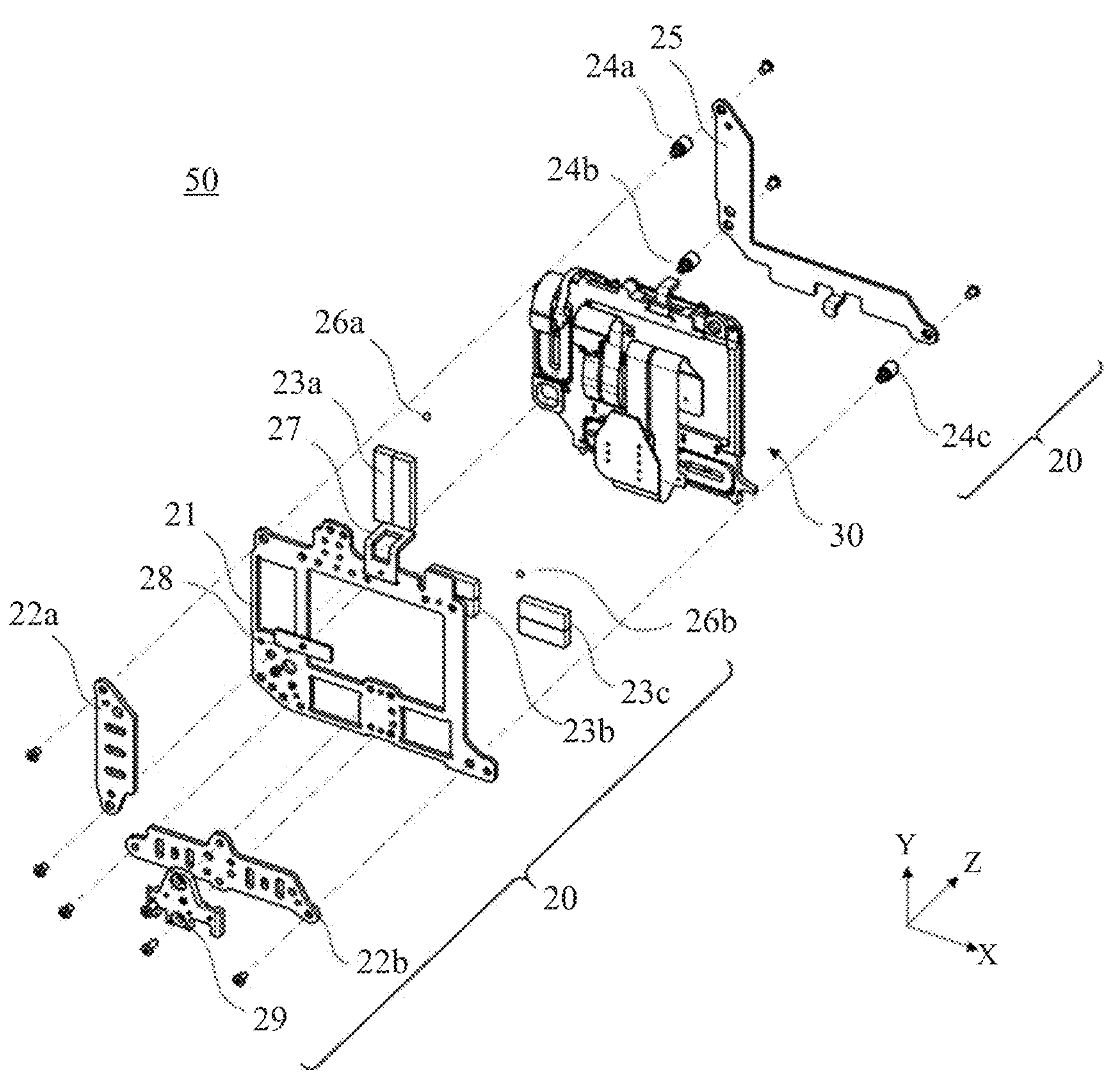
FIG. 3 is an exploded perspective view of the image stabilizing unit according to this embodiment.

Referring now to FIGS. 2 and 3, a description will be given of a detailed structure of the image stabilizing unit (first image stabilizing unit 50). The structure of the second image stabilizing unit 60 is similar to that of the first image stabilizing unit 50, and thus a description thereof will be omitted. FIGS. 2 and 3 are exploded perspective views of the first image stabilizing unit 50. FIG. 2 illustrates the first image stabilizing unit 50 viewed from the object side, and FIG. 3 illustrates the first image stabilizing unit viewed from the image side. The first image stabilizing unit 50 includes the fixed portion 20 and the movable portion 30. In FIGS. 2 and 3, the movable portion 30 is illustrated not exploded, and the fixed portion 20 is illustrated exploded.

The fixed portion 20 includes a base plate (fixed member) 21, a first rear yoke 22*a*, a second rear yoke 22*b*, a first rear magnet unit 23*a*, a second rear magnet unit 23*b*, and a third rear magnet unit 23*c*. A first opening 21*a*, a second opening 21*b*, and a third opening 21*c* are formed in the base plate 21. The first rear magnet unit 23*a*, the second rear magnet unit 23*b*, and the third rear magnet unit 23*c* are fixed to the first rear yoke 22*a* and the second rear yoke 22*b*, respectively, with an adhesive or the like. The first rear magnet unit 23*a*, the second rear magnet unit 23*b*, and the third rear magnet unit 23*c* are arranged so as to be surrounded by the first opening 21*a*, the second opening 21*b*, and the third opening 21*c*, respectively. The first rear yoke 22*a* and the second rear yoke 22*b* are fixed to the base plate 21 with screws.

In this embodiment, the first rear magnet unit 23*a*, the second rear magnet unit 23*b*, and the third rear magnet unit 23*c* are formed by arranging two magnets magnetized in the optical axis direction (Z direction) so as to generate magnetic fields in opposite directions. This embodiment is not limited to this example, and a single magnet magnetized with two poles may be used.

The fixed portion 20 includes a first support member 24*a*, a second support member 24*b*, a third support member 24*c*, and a front yoke 25. The front yoke 25 is fixed to the base plate 21 with screws via the first support member 24*a*, the second support member 24*b*, and the third support member 24*c*. The first support member 24*a*, the second support member 24*b*, and the third support member 24*c* are restricting portions that are disposed at positions that restrict the movement of the movable portion 30, and restrict the movement of the movable portion 30 to a predetermined range in the optical-axis orthogonal plane 12*c*. A buffer material such as rubber is provided at contact locations of the first support member 24*a*, the second support member 24*b*, and the third support member 24*c* with the movable portion 30 and absorb impacts at the time of contact, thereby preventing damage and reducing impact noise.

The first rear yoke 22*a* and the front yoke 25 are arranged to sandwich the first rear magnet unit 23*a* in the optical axis direction, and the first rear magnet unit 23*a* forms a first magnetic circuit that passes through the first rear yoke 22*a* and the front yoke 25. Similarly, the second rear yoke 22*b* and the front yoke 25 are arranged to sandwich the second rear magnet unit 23*b* and the third rear magnet unit 23*c* in the optical axis direction. The second rear magnet unit 23*b* and the third rear magnet unit 23*c* form the second magnetic circuit and the third magnetic circuit, respectively.

The fixed portion 20 further includes a first thrust yoke (first yoke member) 27, a fixed metal plate 28, and a base member 29. The first thrust yoke 27 is disposed at a position facing a thrust magnet (magnet member) 38 described later, and is fastened to the fixed metal plate 28 with a screw. The fixed metal plate 28 is fixed to the base plate 21 with a screw or adhesive (not illustrated). In this embodiment, the first thrust yoke 27 is configured as a single part, but it may be integrated with the base plate 21. In that case, the base plate 21 is formed of a magnetic material, and the fixed metal plate 28 is unnecessary. The base member 29 is fixed to the base plate 21 with a screw together with the second rear yoke 22*b*, and a drive FPC 34*a* described later is attached.

Figure 4:
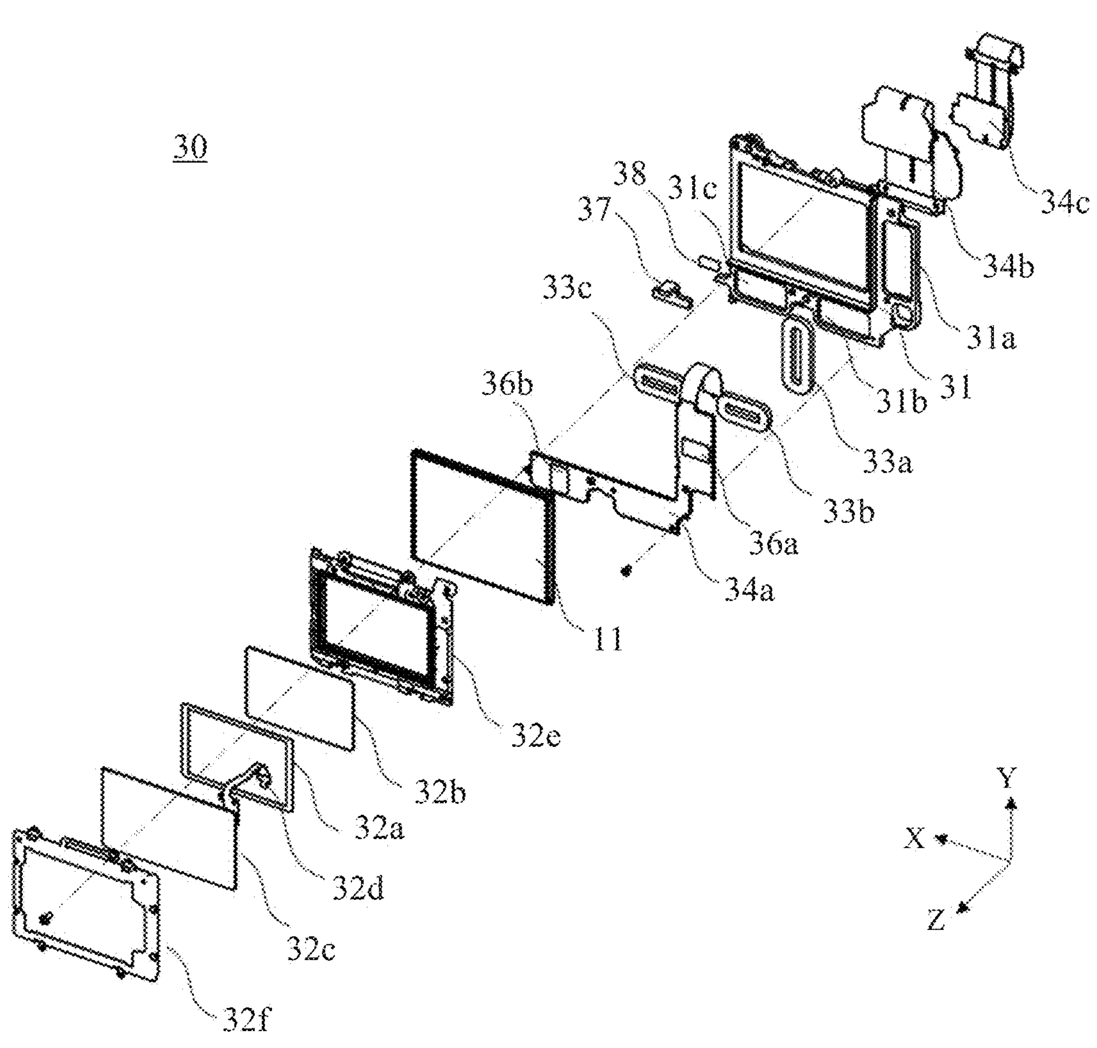
FIG. 4 is an exploded perspective view of a movable portion according to this embodiment.
Figure 5:
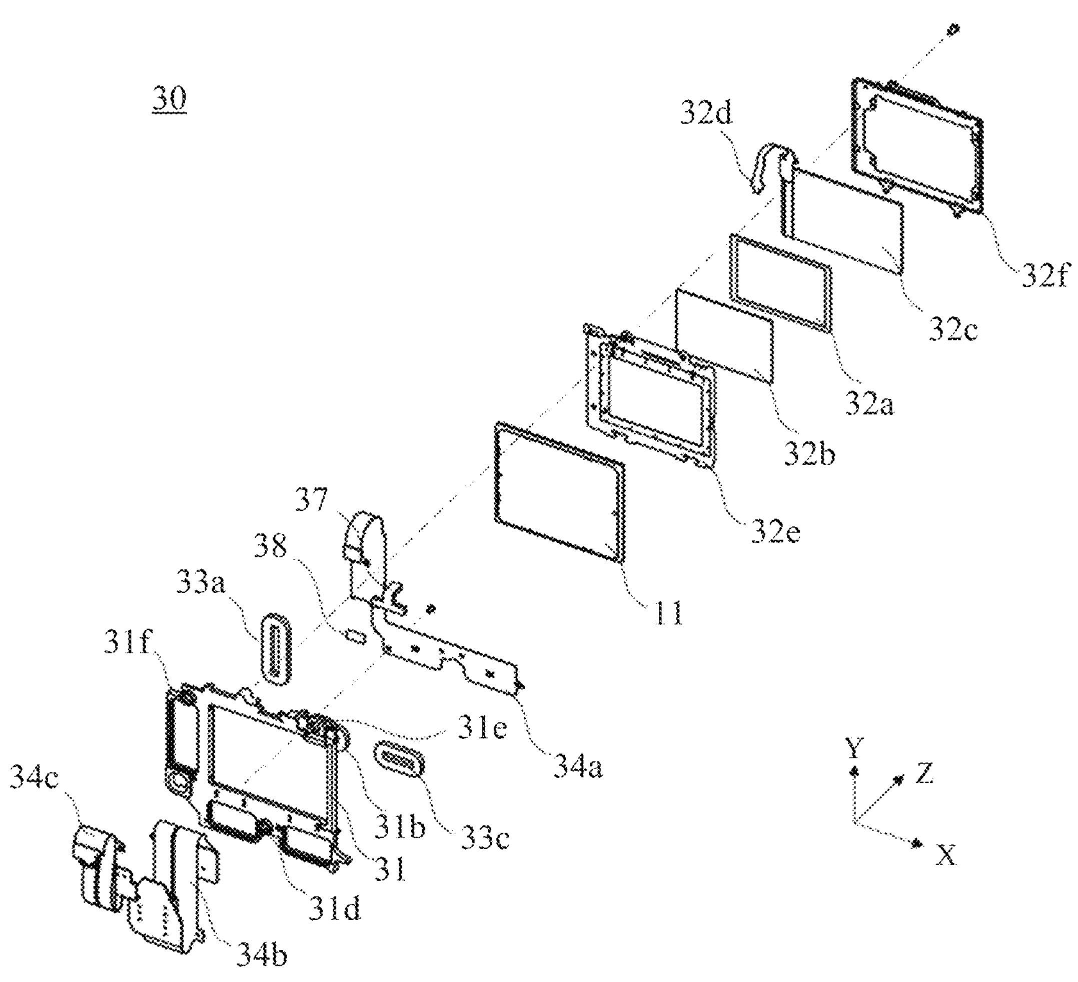
FIG. 5 is an exploded perspective view of the movable portion according to this embodiment.

Referring now to FIGS. 4 and 5, a description will be given of a detailed structure of the movable portion 30 constituting the image stabilizing unit. FIGS. 4 and 5 are exploded perspective views of the movable portion 30. FIG. 4 illustrates the movable portion 30 viewed from the object side, and FIG. 5 illustrates the movable portion 30 viewed from the image side.

The movable portion 30 includes an image sensor 11 and a holding member (movable member) 31 that holds the image sensor 11. The image sensor 11 is fixed to the holding member 31 with an adhesive or the like. The holding member 31 is movable relative to the base plate 21 in an direction orthogonal to the optical axis 12*a*.

The movable portion 30 further includes a mask 32*a*, an infrared absorption filter 32*b*, an optical low-pass filter 32*c*, and a vibration unit 32*d*. The mask 32*a*, the infrared absorption filter 32*b*, and the optical low-pass filter 32*c* are held by a holder member 32*e* and a holder metal plate 32*f*, and are fixed to the image sensor 11 with an adhesive or the like. The mask 32*a* prevents unnecessary light outside the imaging optical path from entering the image sensor 11. The optical low-pass filter 32*c* reduces moiré caused by the repetitive pattern of the object. The vibration unit 32*d* is provided to the optical low-pass filter 32*c*, and removes foreign matters such as dust adhering to the surface of the optical low-pass filter 32*c* by vibrating the optical low-pass filter 32*c*. The foreign matter removing principle and control by the vibration unit 32*d* are well known, so a detailed description will be omitted.

The movable portion 30 further includes a first coil 33*a*, a second coil 33*b*, a third coil 33*c*, and a drive FPC 34*a*. The drive FPC 34*a* is disposed so as to overlap the first coil 33*a*, the second coil 33*b*, and the third coil 33*c* on the optical-axis projection surface (on the XY plane when viewed from the Z direction), and is fixed to the holding member 31 with screws, adhesive, or the like.

The holding member 31 further includes a first concave portion 31*a*, a second concave portion 31*b*, and a third concave portion 31*c*. The first coil 33*a*, the second coil 33*b*, and the third coil 33*c* are disposed in the first concave portion 31*a*, the second concave portion 31*b*, and the third concave portion 31*c*, respectively, and are fixed to the holding member 31 with an adhesive or the like.

The first magnetic circuit (first rear magnet unit 23*a*) and the first coil 33*a* form a VCM serving as a first actuator. The second magnetic circuit (second rear magnet unit 23*b*) and the second coil 33*b* form a VCM serving as a second actuator. The third magnetic circuit (third rear magnet unit 23*c*) and the third coil 33*c* form a VCM serving as a third actuator. The first actuator, the second actuator, and the third actuator constitute a drive unit configured to drive the holding member 31.

A Lorentz force is generated in a direction orthogonal to the magnetic field generated in the optical axis direction by the first magnetic circuit and the current flowing through the first coil 33*a*, and a resultant direction of the Lorentz force changes depending on the direction of current flow through the first coil 33*a*. Similar Lorentz forces are also generated in the second magnetic circuit and second coil 33*b*, and in the third magnetic circuit and third coil 33*c*. The first actuator generates a translational force in the X direction. The second actuator and the third actuator generate forces approximately parallel to the Y direction, the sum of the respective forces generates a translational force in the Y direction, and a difference between the respective forces generates a rotational force around the optical axis.

Figure 6:
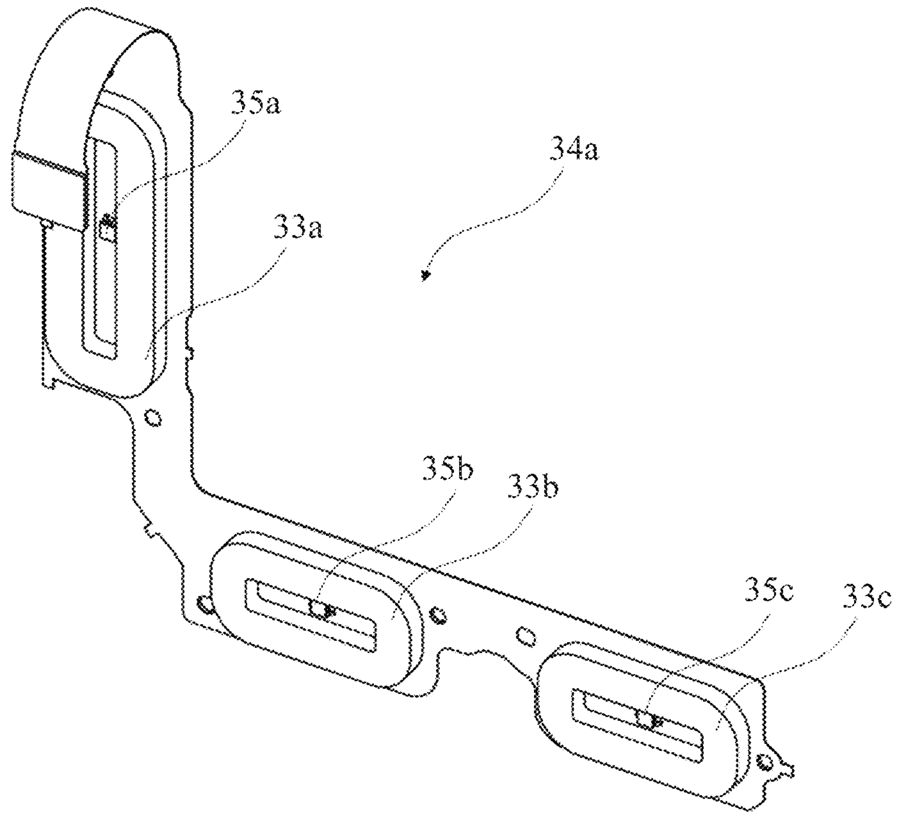
FIG. 6 is a perspective view of a drive flexible printed circuit (FPC) according to this embodiment.

Referring now to FIG. 6, a description will be given of a structure of the drive FPC 34*a* constituting the movable portion 30. FIG. 6 is a perspective view of the drive FPC 34*a*. A first detection element 35*a*, a second detection element 35*b*, and a third detection element 35*c* are attached to the drive FPC 34*a*. The first detection element 35*a*, the second detection element 35*b*, and the third detection element 35*c* are a second detector that detects position information on the holding member 31 relative to the base plate 21.

The first detection element 35*a* is disposed inside the first coil 33*a*, the second detection element 35*b* is disposed inside the second coil 33*b*, and the third detection element 35*c* is disposed inside the third coil 33*c*. Each of the first detection element 35*a*, the second detection element 35*b*, and the third detection element 35*c* is, for example, a Hall element. The first detection element 35*a* detects the magnetic force of the first magnetic circuit, and the first image-stabilizing control unit 15*a* calculates position information (more specifically a position and an angle around the optical axis) on the movable portion 30 relative to the fixed portion 20 in the optical-axis orthogonal plane 12*c* based on the detection result of the first detection element 35*a*. This is similarly applicable to the second detection element 35*b* and the third detection element 35*c*.

The first coil 33*a*, the second coil 33*b*, and the third coil 33*c* are electrically connected to the drive FPC 34*a*, and the first image-stabilizing control unit 15*a* controls the current flowing through each coil via the drive FPC 34*a*. That is, the first image-stabilizing control unit 15*a* performs feedback control based on the deviation between a moving target value of the image sensor 11 based on the image stabilizing information detected by the first shake detector 16*a* and the current position information on the image sensor 11 detected by each detection element (Hall element). Thereby, the first image-stabilizing control unit 15*a* controls the driving of the movable portion 30.

The movable portion 30 is supported on the base plate 21 via balls (rollable members) 26*a*, 26*b*, and 26*c* movably within the optical-axis orthogonal plane 12*c*. The balls 26*a*, 26*b*, and 26*c* are respectively arranged inside a first enclosing portion 31*d*, a second enclosing portion 3*l*, and a third enclosing portion 31*f* provided to the holding member 31. In a case where the movable portion 30 moves in the optical-axis orthogonal plane 12*c* relative to the fixed portion 20, the balls 26*a*, 26*b*, and 26*c* roll, so the load due to frictions with the holding member 31 and the base plate 21 is small.

The movable portion 30 further includes a thrust magnet 38 and a second thrust yoke (second yoke member) 37. The thrust magnet 38 and the second thrust yoke 37 are disposed at a position facing the first thrust yoke 27 disposed in the fixed portion 20, and are fixed to the holding member 31 with screws, adhesive, or the like (not illustrated). The thrust magnet 38 forms a fourth magnetic circuit that passes through the first thrust yoke 27 and the second thrust yoke 37. The movable portion 30 is biased in the optical axis direction (−Z direction) toward the base plate 21 by the suction force generated between the thrust magnet 38 and the first thrust yoke 27. That is, the thrust magnet 38, the first thrust yoke 27, and the second thrust yoke 37 constitute a first biasing portion that biases the movable portion 30 toward the fixed portion 20 in the optical axis direction (−Z direction).

The movable portion 30 further includes a first thrust metal plate 36*a* and a second thrust metal plate 36*b*. The first thrust metal plate 36*a* is disposed at a position facing the first rear magnet unit 23*a*, the second thrust metal plate 36*b* is disposed at a position facing the third rear magnet unit 23*c*, and the first thrust metal plate 36*a* and the second thrust metal plate 36*b* are fixed to the drive FPC 34*a* with an adhesive or the like. The first thrust metal plate 36*a* and the second thrust metal plate 36*b* are formed of a magnetic material, and generate a suction force between the opposing first rear magnet unit 23*a* and second rear magnet unit 23*b*. That is, the first thrust metal plate 36*a* and the second thrust metal plate 36*b* respectively constitute a second biasing portion and a third biasing portion that bias the movable portion 30 toward the fixed portion 20.

The first, second, and third biasing portions are arranged so that the center of gravity of the movable portion 30 is located inside a triangle formed by connecting the biasing portions on the optical-axis orthogonal plane 12*c*. This is similarly applicable to the arrangement of the balls 26*a*, 26*b*, and 26*c*. As a result, well-balanced biasing forces can be generated on the movable portion 30. Thus, the movable portion 30 can be prevented from floating up during driving.

Figure 7A:
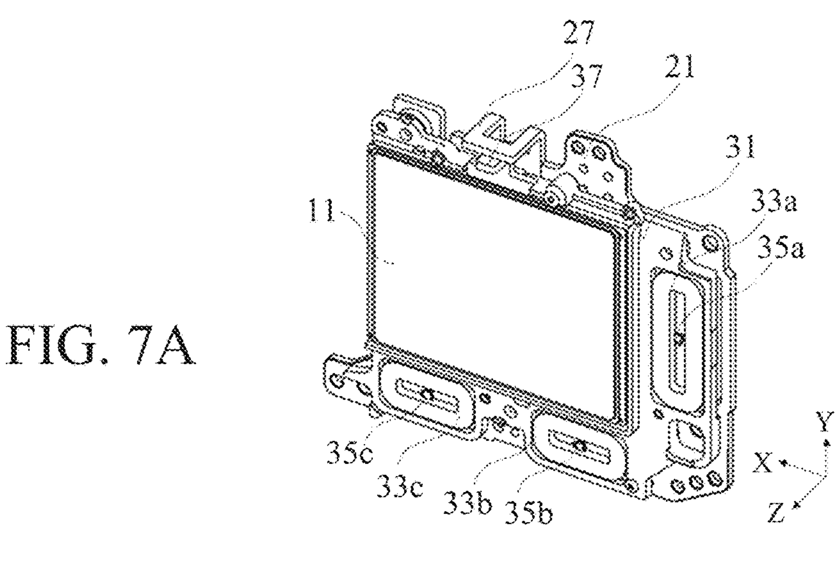
FIGS. 7A to 7C explain a holding assist structure according to this embodiment.
Figure 7B:
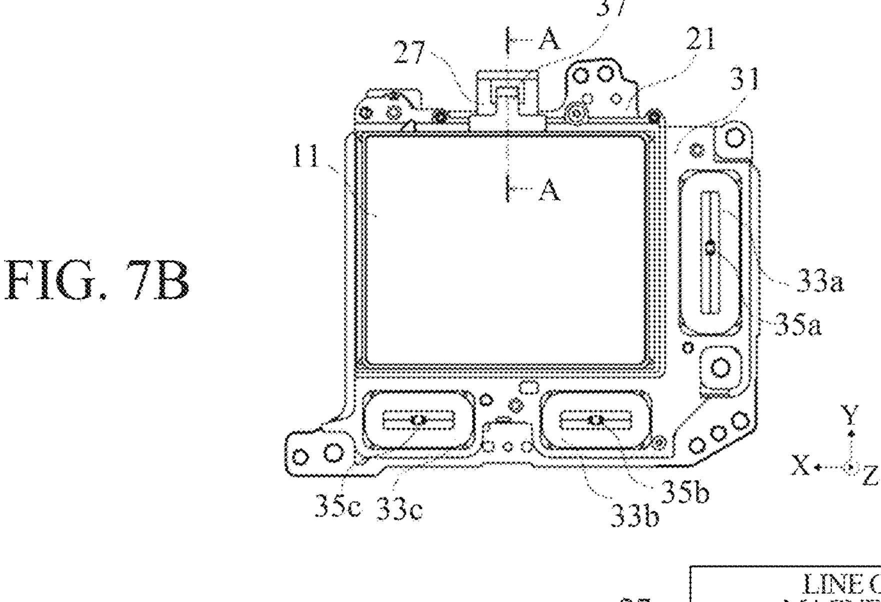
Figure 7C:
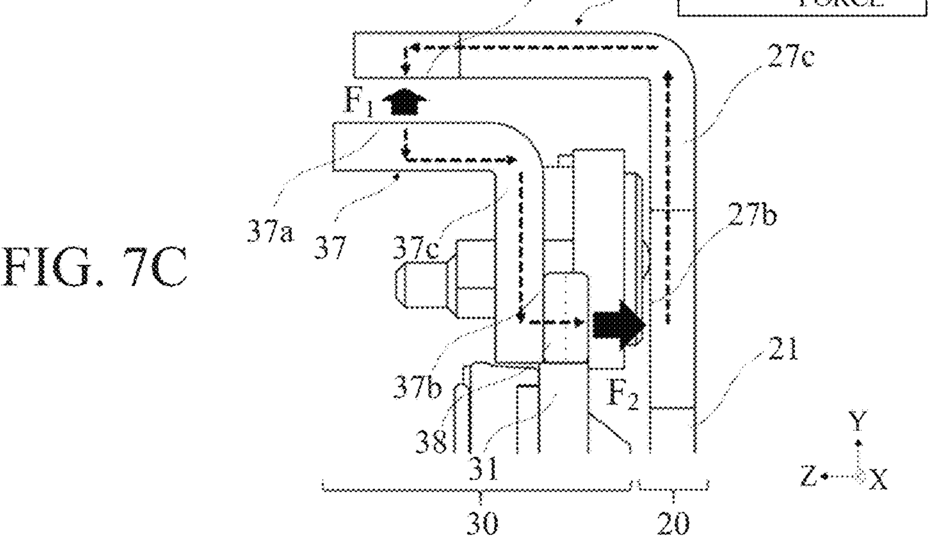

Referring now to FIGS. 7A to 7C, a detailed description will be given of the first biasing portion (holding assist structure) composed of the thrust magnet 38, the first thrust yoke 27, and the second thrust yoke 37. FIG. 7A is a perspective view of the first image stabilizing unit 50, FIG. 7B is a front view of the first image stabilizing unit 50, and FIG. 7C is a sectional view taken along a line A-A in FIG. 7B. FIGS. 7A to 7C illustrate only parts relating to the description of the first biasing portion.

As described above, the first thrust yoke 27 is fixed to the base plate 21 constituting the fixed portion 20, and the thrust magnet 38 and the second thrust yoke 37 are disposed on the holding member 31 constituting the movable portion 30.

As illustrated in FIG. 7C, the first thrust yoke 27 and the second thrust yoke 37 have a first surface 27*a* and a second surface 37*a* that overlap (face) each other on a projection plane in the vertical direction (Y direction), and are adjacent to each other in the vertical direction (Y direction). The first thrust yoke 27 and the second thrust yoke 37 have a third surface 27*b* and a fourth surface 37*b* that overlap (face) each other on a projection plane in the optical axis direction (Z direction). The first thrust yoke 27 has a first connector 27*c* that connects the first surface 27*a* and the third surface 27*b*. The second thrust yoke 37 has a second connector 37*c* that connects the second surface 37*a* and the fourth surface 37*b*.

The thrust magnet 38 is disposed so that it contacts the fourth surface 37*b* of the second thrust yoke 37, and is fixed to the second thrust yoke 37 with screws, adhesive, or the like (not illustrated). The thrust magnet 38 is disposed so that the magnetization direction is parallel to the optical axis direction (Y direction). Thus, the thrust magnet 38 forms a fourth magnetic circuit passing through the first thrust yoke 27 and the second thrust yoke 37, as illustrated by the dashed arrow in FIG. 7C.

The fourth magnetic circuit generates a suction force (second biasing force) F2 between the thrust magnet 38 and the third surface 27*b* of the first thrust yoke 27. The movable portion 30 is biased toward the base plate 21 by the suction force F2.

The fourth magnetic circuit generates a suction force (first biasing force) F1 between the first surface 27*a* of the first thrust yoke 27 and the second surface 37*a* of the second thrust yoke 37. In this embodiment, the first surface 27*a* (one surface of the fixed portion 20) is disposed above the second surface 37*a* (one surface of the movable portion 30) in the vertical direction (Y direction). Thereby, the suction force F1 can be generated in the +Y direction (opposite to the gravity direction at the normal position). In other words, the suction force F1 can be applied in a direction that cancels the weight of the movable portion 30, and thus the drive force of the VCM necessary to hold the movable portion 30 can be reduced (holding assist effect). Thus, the power consumption associated with holding the movable portion 30 can be reduced. In addition, the generator of the suction force F1 utilizes the magnetic circuit of the first biasing portion. Hence, no additional dedicated parts or mechanisms are required, and thus this structure can prevent the size of the first image stabilizing unit 50 from increasing or prevent the number of parts from increasing.

The suction force F1 may be always set to be smaller than the weight of the movable portion 30 in the drive control range of the movable portion 30. That is, the suction force F1 is smaller than the gravity acting on the holding member 31 in the drivable range of the holding member 31 by the drive unit. For example, if the suction force F1 exceeds the weight of the movable portion 30, the movable portion 30 is biased in the +Y direction by the suction force F1. Thus, this causes a drive load in driving the movable portion 30, and the driving controllability (i.e., vibration controllability) of the movable portion 30 may decrease. Accordingly, setting the suction force F1 to always be smaller than the weight of the movable portion 30 can reduce the power consumption without decreasing the driving controllability of the movable portion 30.

In this embodiment, the thrust magnet 38 is disposed on the movable portion 30 (fourth surface 37*b*), but this embodiment is not limited to this example. Even if the thrust magnet 38 is disposed on the fixed portion 20 (third surface 27*b*), the suction forces F2 and F1 similarly act, so they may be disposed on the fixed portion 20 (third surface 27*b*).

Figure 8:
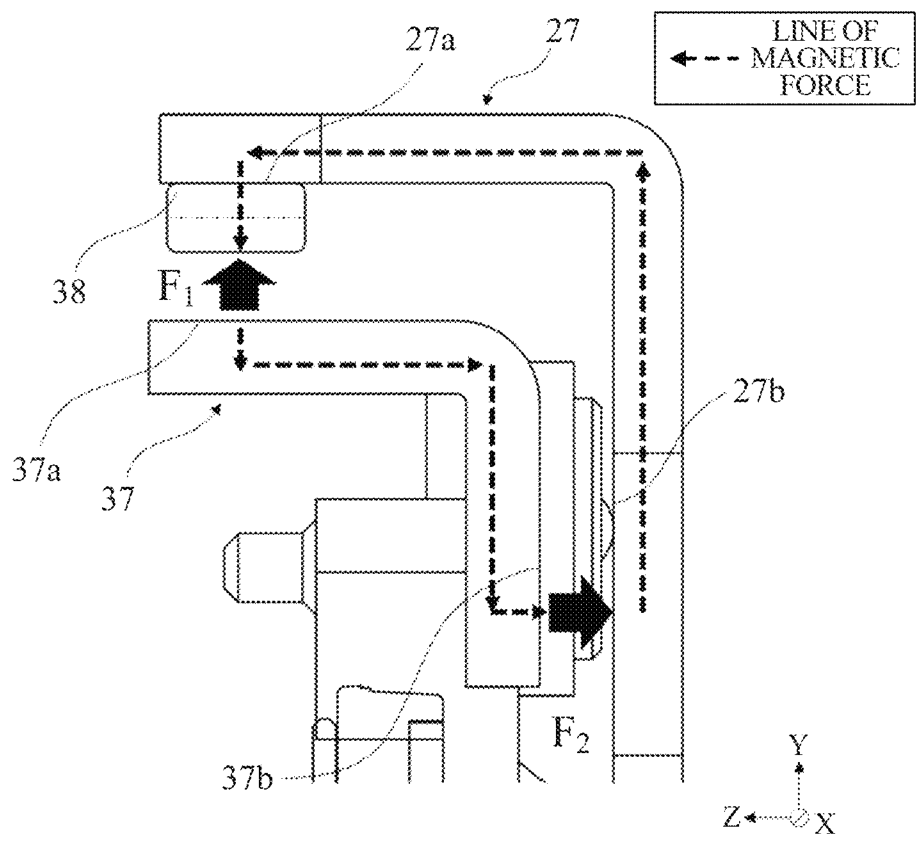
FIG. 8 is a sectional view of a holding assist structure according to a variation.

Referring now to FIG. 8, a description will be given of a variation of this embodiment. FIG. 8 is a sectional view of the first biasing portion (holding assist structure) according to the variation, illustrating an example in which the thrust magnet 38 in FIG. 7C is disposed on the first surface 27*a* of the first thrust yoke 27. As illustrated in FIG. 8, the thrust magnet 38 may be disposed on the first surface 27*a* or the second surface 37*a* so that the magnetization direction of the thrust magnet 38 is parallel to the vertical direction (Y direction). Even in the structure illustrated in FIG. 8, a magnetic circuit equivalent to the fourth magnetic circuit in FIG. 7C can be formed, and the suction forces F2 and F1 can be similarly applied.

As described above, in this embodiment, the thrust magnet 38 is disposed on one of the third surface 27*b* and the fourth surface 37*b* so that the magnetization direction coincides with the second direction. This embodiment is not limited to this example, and the thrust magnet 38 may be disposed on one of the first surface 27*a* and the second surface 37*a* so that the magnetization direction coincides with the first direction, as in the variation described with reference to FIG. 8. In either arrangement, the holding member 31 is biased in the first direction toward the base plate 21 via the first surface 27*a* and the second surface 37*a* by the first biasing force. The holding member 31 is biased in the second direction toward the base plate 21 via the third surface 27*b* and the fourth surface 37*b* by the second biasing force.

Figure 9:
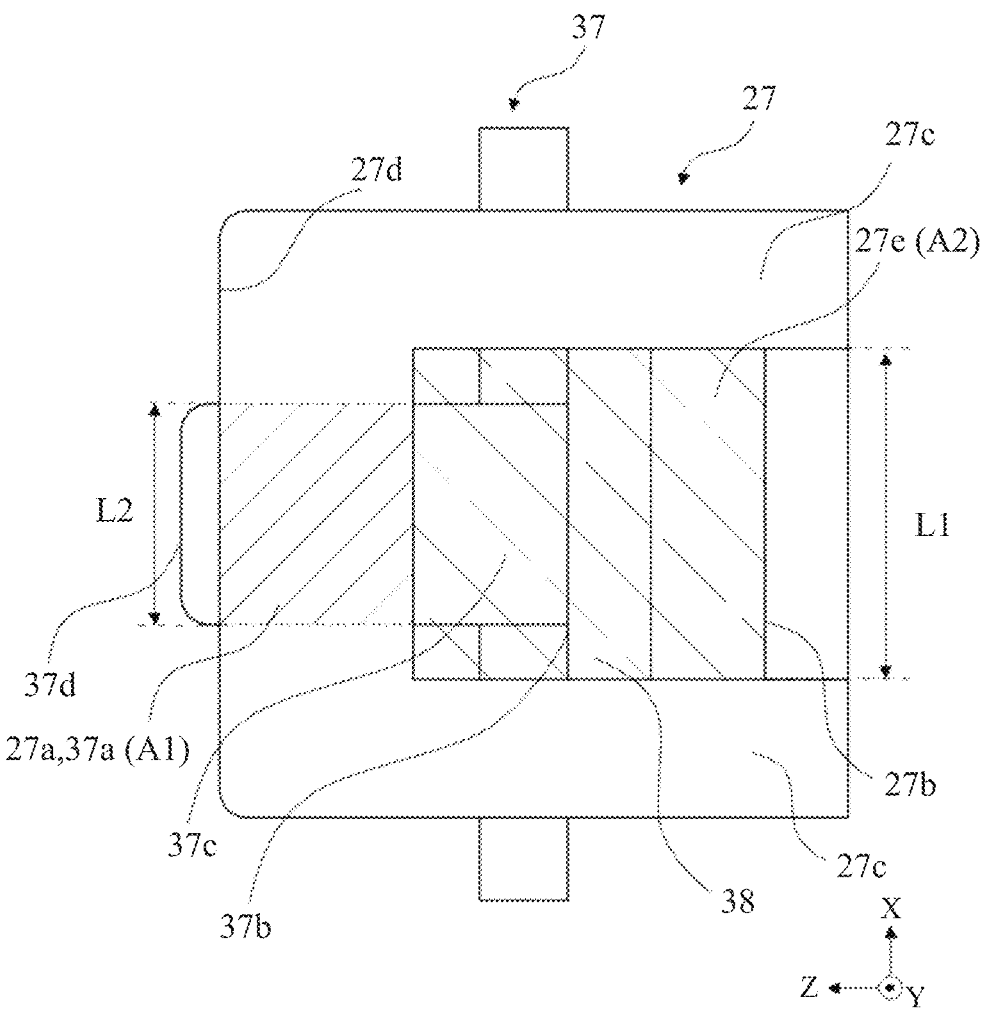
FIG. 9 is a top view of the holding assist structure according to this embodiment.

Referring now to FIG. 9, a description will be given of the shapes of the first thrust yoke 27 and the second thrust yoke 37. FIG. 9 is a top view (projected view) of the first biasing portion as viewed from the +Y direction. A hatched area A1 in FIG. 9 covers the first surface 27*a* of the first thrust yoke 27 and the second surface 37*a* of the second thrust yoke 37, which overlap each other on the projection plane in the vertical direction (Y direction).

A shaded area A2 in FIG. 9 is an opening 27*e* formed in the first connector 27*c* of the first thrust yoke 27. The opening 27*e* is provided so that the first connector 27*c* of the first thrust yoke 27 and the second connector 37*c* of the second thrust yoke 37 do not overlap each other on the projection surface in the vertical direction (Y direction). Providing the opening 27*e* can increase a distance between the first connector 27*c* and the second connector 37*c*, and restrain the magnetic flux passing through the first thrust yoke 27 from leaking between the first connector 27*c* and the second connector 37*c*. Therefore, the decrease in the suction force F1 due to the leakage of the magnetic flux can be suppressed, and the holding assist effect can be efficiently exhibited.

Assume that L1 is a length in the horizontal direction (X direction, third direction) of the opening 27*e*, L2 is a length in the horizontal direction (X direction) of the second surface 37*a* of the second thrust yoke 37, and L3 is a maximum drive amount of the movable portion 30 in the horizontal direction (X direction) (not illustrated). In this embodiment, the opening 27*e* is formed so as to satisfy the following inequality: $L1>L2+L3$. Satisfying this inequality can prevent the second surface 37*a* of the second thrust yoke 37 from overlapping the first connector 27*c* of the first thrust yoke 27 in the vertical direction (Y direction) within the control range (drivable range) of the movable portion 30. Thereby, the area on which the suction force F1 acts (the (first) area where the first surface 27*a* and the second surface 37*a* overlap each other in the vertical direction) can be constant. Thus, the generation of a force component of the suction force F1 in the horizontal direction (X direction) can be suppressed, and the drive controllability (i.e., image stabilizing controllability) of the movable portion 30 can be improved.

An end 37*d* of the second surface 37*a* of the second thrust yoke 37 in the optical axis direction (+Z direction) is disposed outside an end 27*d* of the first surface 27*a* of the first thrust yoke 27 in the optical axis direction (+Z direction). If the end 37*d* of the second surface 37*a* is disposed inside the end 27*d* of the first surface 27*a*, a magnetic force acts from the first surface 27*a* toward the second surface 37*a*, and thus the suction force F1 is generated obliquely relative to the vertical direction (Y direction). Therefore, the holding assist effect of the suction force F1 in the vertical direction (Y direction) is reduced. In addition, since a force component in the opposite direction (+Z direction) to the suction force F2 is generated, a sufficient biasing force may not be able to be obtained, or the size of the thrust magnet 38 increases to secure the necessary biasing force. In consideration of this possibility, an efficient magnetic circuit can be formed by disposing the end 37*d* of the second surface 37*a* outside the end 27*d* of the first surface 27*a*.

Figure 10A:
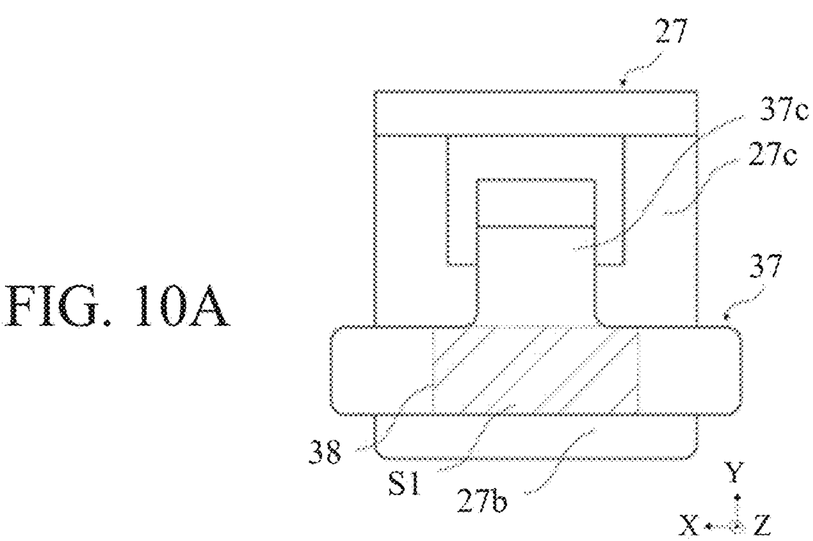
FIGS. 10A to 10C are front views of the holding assist structure according to this embodiment.
Figure 10B:
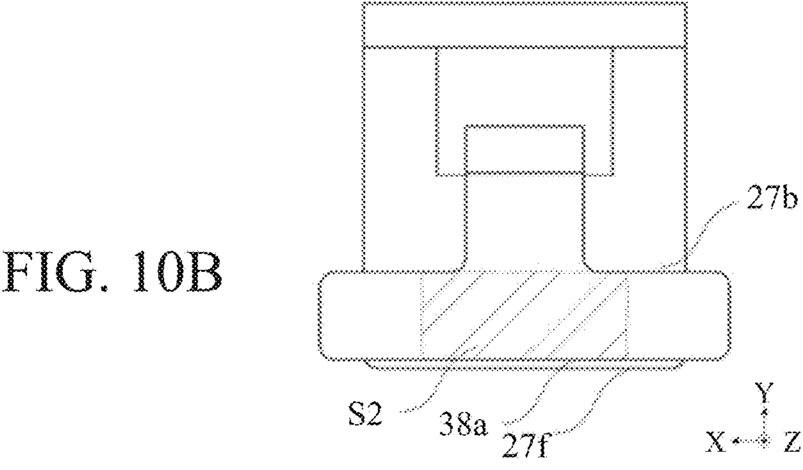
Figure 10C:
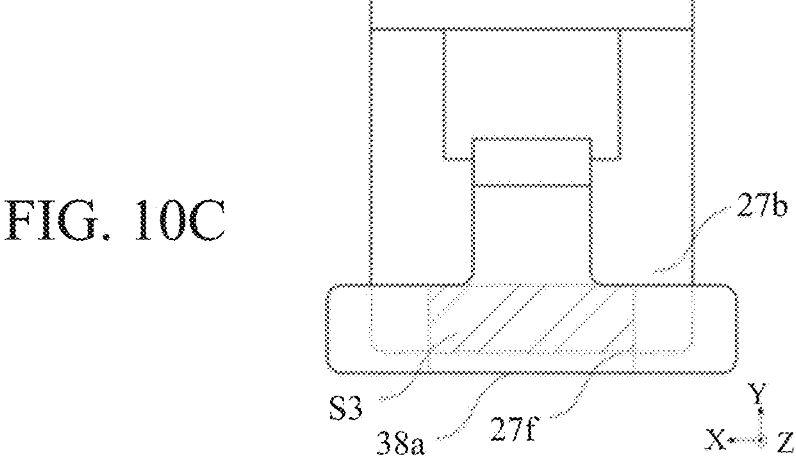

Referring now to FIGS. 10A to 10C, a description will be given of a relationship between the thrust magnet 38 and the third surface 27*b* of the first thrust yoke 27. FIGS. 10A to 10C are front views of the first biasing unit viewed from the +Z direction in the normal position orientation of the imaging system 10. FIG. 10A illustrates that the movable portion 30 is held at a position that is substantially coincides with the optical axis 12*a* (i.e., held at the center). FIG. 10B illustrates a state in which the movable portion 30 has moved to the maximum position movable in the −Y direction within its control range. FIG. 10C illustrates power-off states of the first coil 33*a*, the second coil 33*b*, and the third coil 33*c* (i.e., the imaging system 10 is powered off). At this time, the movable portion 30 is stationary in contact with one of the first support member 24*a*, the second support member 24*b*, and the third support member 24*c*.

In the state of FIG. 10A, the area of a region where the thrust magnet 38 and the third surface 27*b* of the first thrust yoke 27 overlap each other on the projection plane in the optical axis direction (Z direction) is defined as S1. Similarly, the area in the state of FIG. 10B is defined as S2, and the area in the state of FIG. 10C is defined as S3.

As illustrated in FIGS. 10A and 10B, the thrust magnet 38 may be disposed so that the overlapping area between the thrust magnet 38 and the third surface 27*b* in the optical axis direction (Z direction) is constant (S1=S2) within the control range of the movable portion 30. That is, the size of the area (second area) may be constant where the thrust magnet 38 and the third surface 27*b* or the fourth surface 37*b*, which faces the thrust magnet 38 via a predetermined gap, overlap each other in the optical axis direction (second direction).

In driving the movable portion 30, making the area constant can suppress the generation of the force component of the suction force F2 acting on the thrust magnet 38 in the optical-axis orthogonal direction (XY plane direction), and improve the drive controllability (i.e., image stabilizing controllability) of the movable portion 30. While FIG. 10B illustrates only a state in which the movable portion 30 has moved to the maximum position in the −Y direction within the control range, the position is limited to the maximum position and the area may be constant throughout the control range within the optical-axis orthogonal plane 12*c* (XY plane). Thereby, the decrease in drive controllability can be suppressed, which accompanies the generation of the force component of the suction force F2 in the optical-axis orthogonal direction (XY plane direction) throughout the entire control range of the movable portion 30.

On the other hand, as illustrated in FIG. 10C, while the imaging system 10 is powered off, the end 38*a* in the −Y direction (lower end) of the thrust magnet 38 may be located lower than the end 27*f* in the −Y direction (lower end) of the third surface 27*b* of the first thrust yoke 27. That is, while the holding member 31 moves downward and contacts the restricting portion (24*a* to 24*c*), the end 38*a* may be located closer to the end 27*f* of the third surface 27*b* or the fourth surface 37*b*, which faces the thrust magnet 38 via a predetermined gap.

At this time, the overlapping area of the thrust magnet 38 and the third surface 27*b* in the optical axis direction (Z direction) in the power-off state is smaller than the above area within the control range of the movable portion 30, that is, S3<S1=S2. In a case where the relationship is satisfied, the suction force F2 acting on the thrust magnet 38 generates a force component in the +Y direction (opposite to the gravity direction at the normal position). Therefore, in the power-off state, the suction force F2 can be made to act in a direction that cancels the weight of the movable portion 30. Thus, the drive force of the VCM can be reduced, which is required for the return operation of the body unit 10*a* from the power-off state (FIG. 10C) to the center holding state (FIG. 10A) by turning the power ON (return assist effect). Therefore, the power consumption associated with the return operation of the movable portion 30 can be reduced.

As described above, in this embodiment, the first surface 27*a* of the first thrust yoke 27 and the second surface 37*a* of the second thrust yoke 37 overlap each other in the first direction (Y direction) orthogonal to the optical axis direction (Z direction). The third surface 27*b* of the first thrust yoke 27 and the fourth surface 37*b* of the second thrust yoke 37 overlap each other in the second direction (Z direction) parallel to the optical axis 12*a*. The thrust magnet 38, the first thrust yoke 27, and the second thrust yoke 37 form a magnetic circuit passing through the first surface 27*a*, the second surface 37*a*, the third surface 27*b*, and the fourth surface 37*b*.

The first direction may be parallel to the gravity direction (−Y direction) when the body unit 10*a* is located at a predetermined position, and the first surface 27*a* is disposed on the opposite side (upper side) of the gravity direction with respect to the second surface 37*a*. The predetermined position may be the normal position of body unit 10*a*, and the first direction is the height direction of body unit 10*a*. The first surface 27*a* and second surface 37*a* may face each other in the first direction, and third surface 27*b* and fourth surface 37*b* face each other in the second direction.

This embodiment can provide an image pickup apparatus that has a simple structure and can reduce power consumption regardless of the attitude of the image pickup apparatus.

While the disclosure has described example embodiments, it is to be understood that some embodiments are not limited to the disclosed embodiments. The scope of the following claims is to be accorded the broadest interpretation so as to encompass all such modifications and equivalent structures and functions.

This application claims priority to Japanese Patent Application No. 2023-209448, which was filed on Dec. 12, 2023, and which is hereby incorporated by reference herein in its entirety.

What is claimed is:

1. An image pickup apparatus comprising:

a fixed member;

a movable member holding an image sensor and movable relative to the fixed member in a direction orthogonal to an optical axis;

a drive unit configured to drive the movable member;

a rollable member disposed between the fixed member and the movable member;

a first yoke member disposed on the fixed member;

a second yoke member disposed on the movable member; and a magnet member disposed on one of the first yoke member and the second yoke member, wherein a first surface of the first yoke member and a second surface of the second yoke member overlap each other in a first direction orthogonal to an optical axis direction, wherein a third surface of the first yoke member and a fourth surface of the second yoke member overlap each other in a second direction parallel to the optical axis, and wherein the magnet member, the first yoke member, and the second yoke member form a magnetic circuit passing through the first surface, the second surface, the third surface, and the fourth surface.

2. The image pickup apparatus according to claim 1, wherein the first direction is parallel to a gravity direction when the image pickup apparatus is located at a predetermined position, and wherein the first surface is disposed on an opposite side of the gravity direction with respect to the second surface.

3. The image pickup apparatus according to claim 2, wherein the predetermined position is a normal position of the image pickup apparatus, and wherein the first direction is a height direction of the image pickup apparatus.

4. The image pickup apparatus according to claim 1, wherein the first surface and the second surface face each other in the first direction, and wherein the third surface and the fourth surface face each other in the second direction.

5. The image pickup apparatus according to claim 1, wherein the magnet member is disposed on one of the third surface and the fourth surface such that a magnetization direction coincides with the second direction, wherein the movable member is biased in the first direction toward the fixed member via the first surface and the second surface by a first biasing force, and wherein the movable member is biased in the second direction toward the fixed member via the third surface and the fourth surface by a second biasing force.

6. The image pickup apparatus according to claim 5, wherein the first biasing force is smaller than gravity acting on the movable member within a drivable range of the movable member by the drive unit.

7. The image pickup apparatus according to claim 1, wherein the first yoke member includes a first connector connecting the first surface and the third surface, wherein the second yoke member includes a second connector connecting the second surface and the fourth surface, and wherein the first connector has an opening such that the first connector and the second connector do not overlap with each other in the first direction.

8. The image pickup apparatus according to claim 7, wherein the opening is formed within a drivable range of the movable member by the drive unit such that a first area by which the first surface and the second surface overlap with each other in the first direction is constant.

9. The image pickup apparatus according to claim 1, wherein an end of the second surface is disposed outside an end of the first surface in the second direction.

10. The image pickup apparatus according to claim 1, wherein within a drivable range of the movable member by the drive unit, a second area is constant by which the third surface or the fourth surface, which faces the magnet member via a predetermined gap, and the magnet member overlap each other in the second direction.

11. The image pickup apparatus according to claim 1, further comprising a restricting portion configured to restrict a movement of the movable member, and wherein while the movable member moves downward in the first direction and contacts the restricting portion, a lower end portion of the magnet member in the first direction is disposed lower in the first direction than a lower end portion of the third surface or the fourth surface in the first direction, which faces the magnet member via a predetermined gap.

12. The image pickup apparatus according to claim 1, wherein the magnet member is disposed on one of the first surface and the second surface such that a magnetization direction coincides with the first direction, wherein the movable member is biased toward the fixed member in the first direction via the first surface and the second surface by a first biasing force, and wherein the movable member is biased toward the fixed member in the second direction via the third surface and the fourth surface by a second biasing force.

13. The image pickup apparatus according to claim 1, further comprising a processor configured to control the drive unit, wherein the drive unit includes:

a coil held by the movable member, another magnet member held by the fixed member, a first detector configured to detect blur information on the fixed member, and a second detector configured to detect position information on the movable member relative to the fixed member, and wherein the processor is configured to control the movable member based on the blur information and the position information.

* * * * *